US009420774B1

(12) United States Patent  (10) Patent No.: US 9,420,774 B1
Antonio  (45) Date of Patent: Aug. 23, 2016

(54) ELECTRONIC FISH STRIKE ALARM FOR FREELY HANGING VISUAL BITE INDICATORS

(71) Applicant: Erwin F Antonio, Davis, CA (US)

(72) Inventor: Erwin F Antonio, Davis, CA (US)

( * ) Notice: Subject to any disclaimer, the term of this patent is extended or adjusted under 35 U.S.C. 154(b) by 509 days.

(21) Appl. No.: 13/831,229

(22) Filed: Mar. 14, 2013

(51) Int. Cl.
*A01K 97/12* (2006.01)
*A01K 97/00* (2006.01)

(52) U.S. Cl.
CPC .............. *A01K 97/125* (2013.01); *A01K 97/12* (2013.01)

(58) Field of Classification Search
CPC ....... A01K 97/01; A01K 97/12; A01K 93/02; A01K 97/125
USPC .................................. 43/4.5, 15–17
See application file for complete search history.

(56) References Cited

U.S. PATENT DOCUMENTS

| | | | | |
|---|---|---|---|---|
| 3,744,172 A * | 7/1973 | Kelli | .................................. | 43/17 |
| 4,125,957 A | 11/1978 | Cunningham | | |
| 4,236,340 A | 12/1980 | Cunningham | | |
| 4,376,349 A * | 3/1983 | Yarczower | ........... A01K 97/125 | 43/17 |
| 4,552,318 A | 11/1985 | Durham | | |
| 4,633,608 A * | 1/1987 | Savarino | ............... A01K 97/125 | 43/17 |
| 4,702,031 A | 10/1987 | Sousa | | |
| 5,077,928 A | 1/1992 | Deskevich | | |
| 5,097,618 A * | 3/1992 | Stoffel | .............. | 43/17 |
| 5,570,532 A * | 11/1996 | Shaffer et al. | ...................... | 43/17 |
| 5,586,402 A | 12/1996 | Brent | | |
| 5,669,175 A | 9/1997 | Phipps | | |
| 5,881,488 A * | 3/1999 | Canepa | ............................ | 43/4.5 |
| 5,884,429 A | 3/1999 | Cube | | |
| 6,101,757 A | 8/2000 | Draghici | | |
| 6,253,483 B1 | 7/2001 | Reams | | |
| 6,308,452 B1 | 10/2001 | Fox | | |
| 6,408,561 B1 | 6/2002 | Winter | | |
| 6,763,630 B1 * | 7/2004 | Jenkins | ............................. | 43/17 |
| 6,938,367 B2 | 9/2005 | Cameron | | |
| 7,434,348 B1 * | 10/2008 | Welch | ............................... | 43/17 |
| 7,478,498 B1 | 1/2009 | Barnhart | | |
| 7,624,531 B2 | 12/2009 | Kirby | | |
| 7,963,065 B1 | 6/2011 | Copeland | | |
| 2003/0172577 A1 | 9/2003 | Allen | | |
| 2004/0088899 A1 | 5/2004 | Altrich | | |
| 2007/0068062 A1 | 3/2007 | Zeglen | | |
| 2011/0095894 A1 | 4/2011 | Gibson | | |
| 2012/0131841 A1 * | 5/2012 | Galbraith | ............... | A01K 97/01 43/16 |
| 2012/0222345 A1 | 9/2012 | Sanchez | | |

* cited by examiner

*Primary Examiner* — Marc Burgess

(57) ABSTRACT

An apparatus and method for providing an electronic alarm to alert of a fish bite or nibble when using a fishing bobber or other weighted mass as a hanging bite indicator. A sensor comprising a transmitter and receiver functions to detect changes in fishing line tension. The transmitter is attached to and moves in concert with the hanging bite indicator while the receiver is placed beneath the hanging bite indicator in a fixed position relative to the fishing rod. To set the alarm, slack is released in the baited fishing line, allowing the hanging bite indicator to sag downward on the line until the transmitter is lowered into contact with the receiver. The alarm activates when tension produced in the fishing line by a fish bite causes the hanging bite indicator to lift, thereby separating the transmitter from the receiver. The displaced bite indicator remains hanging on the fishing line for further use by the angler to set the hook and retrieve the fish.

17 Claims, 12 Drawing Sheets

Schematic for a Single-Loop Circuit

ELECTRONIC FISH STRIKE ALARM FOR FREELY HANGING VISUAL BITE INDICATORS

CROSS-REFERENCE TO RELATED APPLICATIONS

This application claims the benefit of provisional patent application Ser. No. 61/611,002, filed 2012 Mar. 14 by the present inventor.

FEDERALLY SPONSORED RESEARCH

Not Applicable

SEQUENCE LISTING OR PROGRAM

Not Applicable

BACKGROUND

1. Field

This application relates to fish bite indicators, specifically to an electronic fishing alarm for producing an alert in response to a fish bite when using a hanging bite indicator.

2. Prior Art

When a baited fishing line is set in water from an immobilized fishing rod and reel, such as one positioned from shore, a fish bite or nibble can be detected with high efficiency by assessing changes in tension in the fishing line. It is common practice for fishermen to monitor changes in fishing line tension by hanging a weighted mass (such as a modified fishing bobber) on baited fishing line for use as a visual bite indicator. In this case, the weighted mass is suspended on fishing line guided between eyelets of the fishing rod where it sags so that tension produced in the line by a fish bite causes the weighted mass to move up and down relative to the rod. Fishing line tension can then be tracked by observing vertical displacements of the hanging weighted mass, hereinafter referred to as the freely hanging visual bite indicator, or alternatively, the hanging bite indicator. Use of this method allows the fisherman to observe changes in fishing line tension from the time of initial fish bite to the point of setting the hook, thus providing means to visually monitor the pattern of fish bites that lead up to the fish fully taking the bait. Monitoring bite activity over time in this manner enables the fisherman to determine when best to hook the fish.

Despite its effectiveness, a major drawback of using the hanging bite indicator method is that it typically requires the fisherman to maintain constant visual focus on the weighted mass as movements indicative of a fish bite can be quick and sporadic, and easily missed. Anglers attempting to identify a fish bite event at its earliest stages, so as to allow the greatest window of time to act in hooking the fish, may be most burdened by adhering to this visual requirement. A number of fish bite indicators described in prior art are designed to help fishermen detect changes in fishing line tension, but few of these inventions address methods to facilitate detection of a fish bite when using a hanging bite indicator and none have been found to adapt for use with virtually any hanging bite indicator, such as one supplied by the user.

The use of hanging bite indicators or the principles thereof in the detection of a fish bite has gained widespread acceptance over several decades as an effective method for fishing. An apparatus that operates as a hanging bite indicator was initially described by Cunningham (1978) in U.S. Pat. No. 4,125,957. This apparatus employs a weighted slack ring device that is slidably attached to baited fishing line guided between two eyelets of the rod. The weighted ring device sags on slack in the line when extended for fishing so that tension produced in the line by a fish bite causes it to elevate, thereby providing a visual indication of the fish bite. A second device disclosed by Cunningham (1980) in U.S. Pat. No. 4,236,340 further employs the principles of the hanging bite indicator with an apparatus comprising a weighted mass attached to a support structure that is then mounted onto the fishing rod. The support structure permits use of the hanging bite indicator on fishing line independent of the rod eyelets.

Additional implementation of the hanging bite indicator method is demonstrated by Durham (1985) in U.S. Pat. No. 4,552,318, in which a hanging bite indicator designed for use with a closed face reel is placed on fishing line guided between the reel and a forwardly positioned rod eyelet to enable sagging on the line as a visual bite indicator. A variation of this apparatus for use with any type of fishing reel was subsequently disclosed by Sousa (1987) in U.S. Pat. No. 4,702,031, in which the apparatus is suspended upon fishing line guided between two eyelets of the fishing rod where it then sags upon the line as a visual bite indicator. Over the years, the methods similar to those described by Cunningham and Sousa (i.e. involving placement of a hanging bite indicator between two eyelets of the fishing rod) have become conventional and use of improvised hanging bite indicators in this regard has become common. However, despite being effective and widely used for fishing, these methods do not provide an alternative, non-visual alert means, and thus require the user to keep constant watch on the hanging bite indicator so as to not miss a fish bite. Maintaining visual attention in this manner during fishing can be time-consuming, tedious, and at times impractical.

The prior art includes additional examples of fish bite detection devices that have been developed based on the principles of the hanging bite indicator. The devices described by Deskevich (1992) in U.S. Pat. No. 5,077,928, Cube (1999) in U.S. Pat. No. 5,884,429, and Barnhart (2009) in U.S. Pat. No. 7,478,498 all implement versions of the hanging bite indicator method to provide a visual indication of a fish bite. Another apparatus described in the pending patent application submitted by Sanchez (2012) in Pub. No. US/2012/0222345 A1 bears strong similarity in design and operation to a conventional hanging bite indicator that is improvised from an ordinary fishing bobber modified with an open snap swivel to enable removable hanging on the fishing line. While these devices continue to demonstrate use of the hanging bite indicator as an effective and desired method for fishing, they do not address means to facilitate detection of a fish bite by providing a non-visual alert.

Brent et al. (1996) describe an apparatus in U.S. Pat. No. 5,586,402 designed to enhance detection of a fish bite using a detachable clamping mechanism that attaches to the fishing rod and operates based on principles of the hanging bite indicator. In this case, fishing line guided between eyelets of the rod is passed through a spiral line guide at the bottom end of a visual indicator rod in a manner that simulates sagging on the line. When tension is produced in the line by a fish bite, the visual indicator rod is forced to slide upward to expose a brightly colored visual alert. A device disclosed by Copeland (2011) in U.S. Pat. No. 7,963,065 B1 functions similarly to that of Brent et al. as a clamping mechanism that operates on principles of the hanging bite indicator. However, these devices also do not implement a non-visual alert means, but instead require the user to maintain focus on the visual indicator rod. Moreover, these devices employ larger and more complex mechanisms that attach to the fishing rod compared to a conventional hanging bite indicator that is generally less obtrusive and only attaches to the fishing line, as previously described. It is often undesirable to affix accessories to the fishing rod while fishing as this may compromise the structure and/or function of the rod. Thus, the benefit of any enhanced alert means provided by these clamping mechanisms may be outweighed by drawbacks in their method of attachment to the fishing gear or in their relative inefficiency of transport with fishing tackle compared to conventional hanging bite indicators.

The prior art further contains examples of devices that incorporate some form of audible alert with a hanging bite indicator. In the apparatus disclosed by Phipps (1997) in U.S. Pat. No. 5,669,175, fishing line is threaded through grooves in two opposing balance arms attached to a main body of mass that functions as a hanging bite indicator. In this configuration, the weighted mass remains balanced and hanging on the line in a static position. Upon a fish bite, the fishing line detaches from the grooves in the balance arms, causing the weighted mass to fall and produce an audible sound upon impact. A similar method is proposed in the patent application by Zeglen (2007) in Pub. No. US2007/0068062 A1, in which a removable hanging bite indicator attached to a bell falls off of the fishing line upon a violent fish bite and produces an audible alert upon impact with the ground. Although these methods do incorporate an audible alert with a hanging bite indicator, they do so with a significant drawback. The alarm is short-lived and can be missed if not perceived by the fisherman at the moment it is sounded. It does not provide an audible alarm that continuously sounds until the user disarms it, such as after the audible alert is perceived.

Another apparatus proposed in the patent application of Altrich et al. (2004) in Pub. No. US2004/0088899 A1 uses a hanging bite indicator with a bell attached to the bottom side in order to provide an audible alert means that responds to movement. However, bells can be suboptimal for alerting a fisherman of a fish bite when used in the context of a hanging bite indicator because a threshold level of force is typically required by the biting fish to pull the hanging bite indicator violently enough to cause the bell to ring. Therefore, fish nibbles or bites resulting in only minute increases in fishing line tension may go unnoticed when using this apparatus.

A number of devices disclosed in the prior art have also been designed to implement electronic alarms to deliver an audible alert upon detection of a fish bite. The majority of these devices require the fishing line to be directly attached to the apparatus in order to sense tension due to a fish bite. For example, some devices operate by attaching the baited fishing line to a lever arm that can then actuate a switch upon a fish bite to produce an audible alarm. These include the devices introduced by Fox (2001) in U.S. Pat. No. 6,308,452 B1, Winter (2002) in U.S. Pat. No. 6,408,561 B1, and Kirby (2009) in U.S. Pat. No. 7,624,531 B2. In these cases, baited fishing line is drawn down from the rod from either between two eyelets or between the reel and a forwardly positioned eyelet in order to connect it to a lever arm on the apparatus. Furthermore, an apparatus described by Draghici (2000) in U.S. Pat. No. 6,101,757 employs a conductive clip that attaches to baited fishing line drawn down from between two eyelets of the rod to simulate sagging in the line. When a fish bites, the upward pull produced in the fishing line causes the clip to detach from the line and fall onto an electrical contact, thereby completing an electrical circuit that activates an electronic alert. Despite having electronic alarm features to facilitate bite detection, these devices are not designed for use with a hanging bite indicator, and thus may appear less appealing to individuals who prefer to use a hanging bite indicator when fishing.

Lastly, there are other devices unrelated to hanging bite indicators that provide an electronic alert means of a fish bite based on movement or bowing produced in the tip of the rod. One example of this type of apparatus is presented by Reams (2001) in U.S. Pat. No. 6,253,483, in which the apparatus is attached to the tip of the fishing rod so that movement or bowing of the tip brings two sensor wires together to complete an alarm circuit and activate an audible alarm. A major drawback of this method, however, is in its sensitivity to fish bites, since in this case a certain threshold of pulling force by the biting fish is required to produce enough tension in the line to cause a sufficient degree of movement or bowing at the tip of the rod. Therefore, it is possible for fishing line to be drawn from the rod or reel by the fish without causing the rod tip to move. In this instance, an angler could miss detection of a fish bite or nibble that manifests as only a minute increase in fishing line tension. Moreover, it is argued that producing an audible alert from an audio source that is contiguous with the fishing line or rod may cause an undesirable transmission of sound down the fishing line that ultimately deters interest of the biting fish for the bait. An angler can avoid these drawbacks by using a hanging bite indicator.

SUMMARY

In accordance with one embodiment an electronic fish bite alarm adapted for use with a hanging bite indicator comprises a sensor having a transmitter and receiver to detect changes in fishing line tension and an alarm processor for activating an electronic alert.

DRAWINGS

FIGURES

In the drawings, closely related figures have the same number but different alphabetic suffixes.

DRAWINGS

Figure 1:
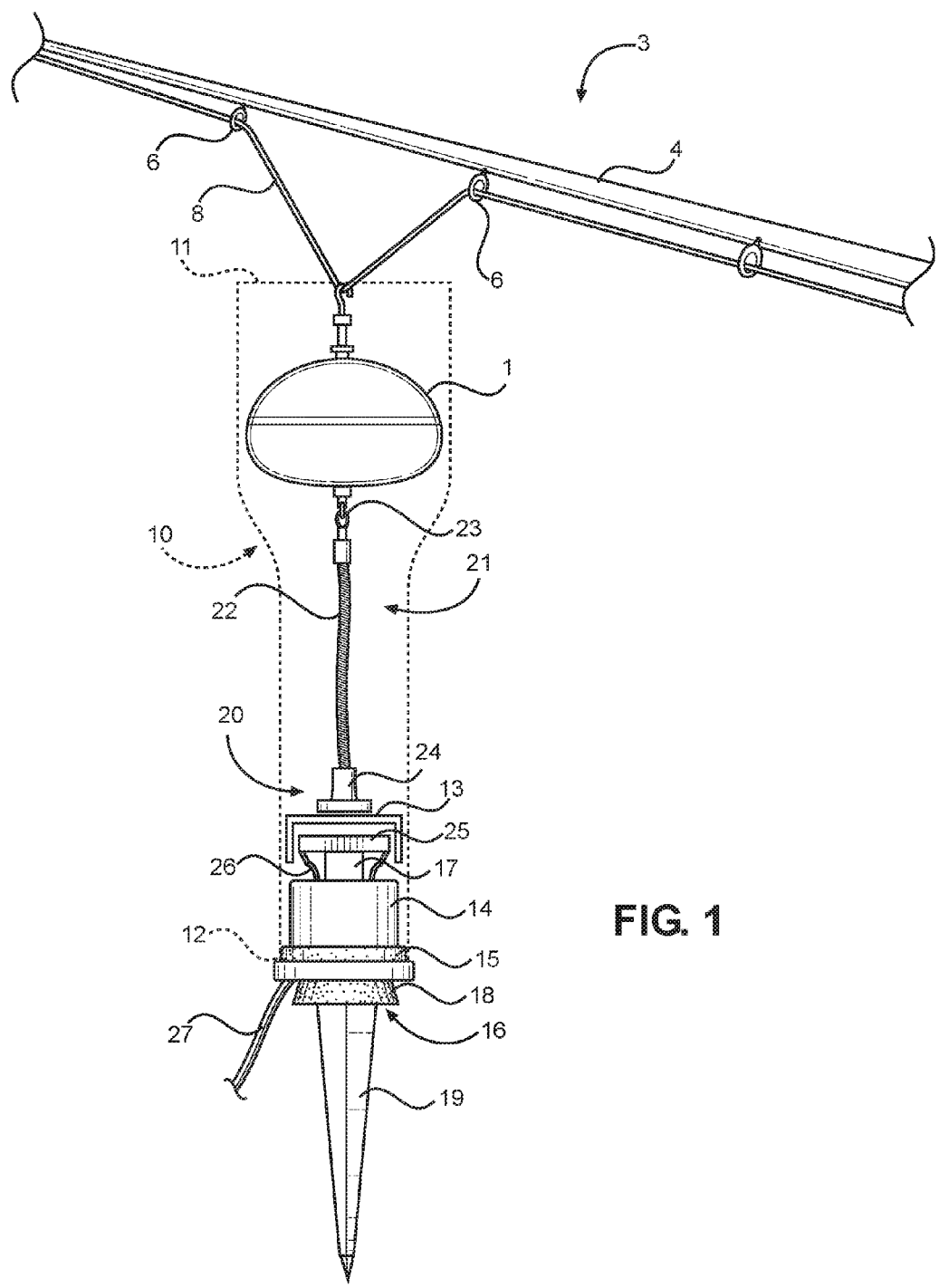
FIG. 1 is a side view of an electronic bite alarm connected to a baited fishing line in accordance with an embodiment.

REFERENCE NUMERALS 1 hanging bite indicator
3 fishing gear
4 fishing rod
6 rod eyelet
8 fishing line
10 sensor housing
11 top end
12 bottom end
13 solid barrier
14 cap
15 cap seal
16 ground stake assembly
17 spacer
18 cork
19 ground stake
20 sensor
21 transmitter
22 tether
23 connector end
24 functional end
25 receiver
26 electrical connections
27 extension cord
28 counterweight
30 alarm processor
31 alarm circuit
32 speaker
33 speaker grill
34 power switch
35 battery
36 battery clip
37 extension cord
38 electrical connections
39 enclosure
41 metal plate insert
42 cover
43 spacer

DETAILED DESCRIPTION

FIG. 1, FIGS. 2A-2C, FIGS. 3A-3B, FIGS. 4A-4B, FIG. 5, FIG. 6, FIG. 7, and FIG. 8—First Embodiment FIG. 1 is a side view of one version of the present apparatus adapted for use with a hanging bite indicator and conventional fishing gear, as is generally indicated at 1 and 3, respectively. The fishing gear includes a pole or rod 4 having a reel attached forwardly of a grip at one end (not shown), a tip formed at the other end (not shown), and one or more eyelets 6 along the length of the rod 4 for guiding the fishing line 8. The rod 4 is preferably mounted in a conventional holding bracket or rod holder (not shown) but may be hand held by the grip. In this embodiment, a hanging bite indicator 1 of substantial weight heavy enough to hold a fishing line taut is placed on baited fishing line 8 between two eyelets 6 of the rod where it is allowed to sag on the line during fishing, as illustrated in FIG. 1. The hanging bite indicator 1 sags freely on the segment of fishing line between eyelets of the rod and does not tether, connect or force the fishing line into a fixed position with any other element of the apparatus or other structure. It is free to displace laterally along the segment of the fishing line on which it hangs until positioned in its natural resting state. While in operation, the hanging bite indicator 1 remains suspended at rest in a static position until tension produced in the fishing line 8 by a fish bite or nibble causes the hanging bite indicator 1 to move up and down relative to the rod 4 as a visual indicator.

The hanging bite indicator 1 is typically improvised from an ordinary fishing bobber and snap swivel in accordance with conventional methods, whereby connecting the base of the swivel to attachment hardware on the top of the bobber and opening the snap to form a hook provides means for hanging the bobber on the fishing line (FIG. 1). In this configuration, a second attachment point at the bottom end of the bobber remains accessible and is utilized to adapt the hanging bite indicator 1 for use with the present apparatus.

FIG. 1 further depicts the internal and external arrangement of elements in this embodiment of the apparatus when connected to a baited fishing line. A sensor 20 comprising a transmitter 21 and receiver 25 functions to detect changes in fishing line tension through contact interactions that regulate the electronic state of the sensor. The transmitter 21 connects to the bottom of the hanging bite indicator 1 via the connector end 23. The connector end 23 of the transmitter includes attachment hardware for securely connecting to compatible attachment hardware at the bottom end of the hanging bite indicator 1. In this version of the apparatus, the connector end 23 having a lightweight wire ring structure of substantial diameter attaches to a hook at the bottom end of the hanging bite indicator 1.

The connector end 23 of the transmitter 21 is formed using a plastic sleeve that secures the wire ring structure to the transmitter's tether 22 (see below). In addition to a ring and hook combination, other types of attachment hardware or material could be used to form a secure connection between the transmitter 21 and hanging bite indicator 1, including lightweight materials such as latches, fabric and non-fabric fasteners, adhesive compounds and materials, and other similarly functioning materials.

From its connection to the hanging bite indicator 1, the transmitter 21 extends downward from the connector end 23 to the functional end 24 via a support or tether 22. The tether 22 is formed from lightweight material of sufficient rigidity (e.g. nylon rope, plastic, aluminum, or paper) to allow the functional end 24 to move up and down in concert with the hanging bite indicator 1. The tether 22 is formed at a predetermined length to extend the functional end 24 of the transmitter downward into close spatial proximity with the receiver 25. Extending the functional end 24 in this manner allows the hanging bite indicator 1 to remain suspended at a predetermined distance above the receiver 25.

Figure 3A:
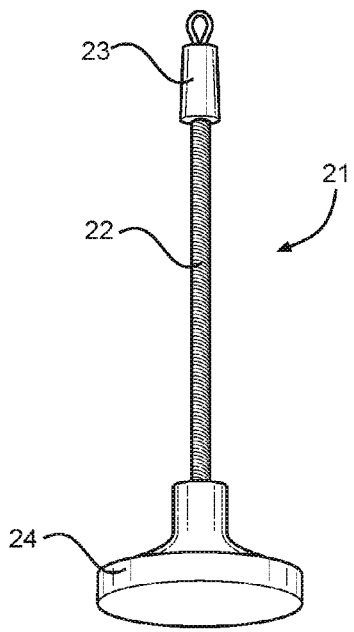
FIG. 3 shows perspective views of the sensor components including a transmitter (A) and receiver (B) in accordance with an embodiment.

The transmitter's functional end 24 has a first contact interface (not shown) for engaging a second contact interface (not shown) on the receiver 25, thereby establishing an electronic interaction that alters the electronic state of the sensor 20 and renders the alarm apparatus armed and ready to activate. Separating the transmitter's functional end 24 from the receiver 25 disrupts the electronic interaction and induces the electronic state of the sensor that activates the alarm. FIG. 3A shows a perspective view of the transmitter 21 having a magnet attached via plastic support to the functional end 24 to provide the first contact interface. The magnet indirectly contacts the second contact interface on the receiver 25 through transmission of a localized magnetic field. The second contact interface of the receiver 25, formed by an electromagnetic (reed) switch, responds to the applied magnetic field by altering its "open" and "closed" electrical state.

This version of the apparatus employs a normally-open electromagnetic switch at the second contact interface of the receiver 25. The normally-open electromagnetic switch transitions into its "closed" electrical state when subjected to the magnetic field exerted by the transmitter's functional end 24; the "open" electrical state is triggered when the applied magnetic field is removed, such as when a fish bite causes the hanging bite indicator 1 to withdraw the transmitter 21 away from contact with the receiver 25.

In this embodiment, all components of the sensor 20 are contained within a sensor housing 10 when the alarm is armed and ready to activate (FIG. 1). The sensor housing 10 functions as a wind barrier and its structure provides means to reduce lateral and rotational motion of the hanging bite indicator/transmitter assembly due to the forces of wind; this optimizes sensitivity of the sensor 20 to upward motion caused by a fish bite. As one example, the sensor housing 10 has a structure that is sufficiently rigid to resist the forces of wind while also having a structural configuration that minimizes wind from entering or being directed into the area of the sensor housing 10 that contains components of the sensor 20. The sensor housing 10 is a hollow tubular structure arranged in vertical orientation to produce a top end 11 and a bottom end 12, as shown in the perspective views in FIG. 2A with the sensor housing 10 tilted forward (left) and tilted back (right). The sensor housing 10 is in a straight configuration although non-straight structures could be employed. The straight configuration provides means for optimizing contact between the transmitter and receiver by allowing the sensor components to position in a straight alignment to form an unobstructed path in which the transmitter can freely displace vertically relative to the receiver. The sensor housing 10 can be fabricated from any material that maintains its structural integrity when subjected to the forces of wind. Hard plastics, such as polyvinyl chloride (PVC), metal, wood, rubber, and cardboard are all examples of materials that can be used to produce the sensor housing 10. Moreover, lightweight materials may be used for efficient transport with fishing tackle.

Figure 2A:
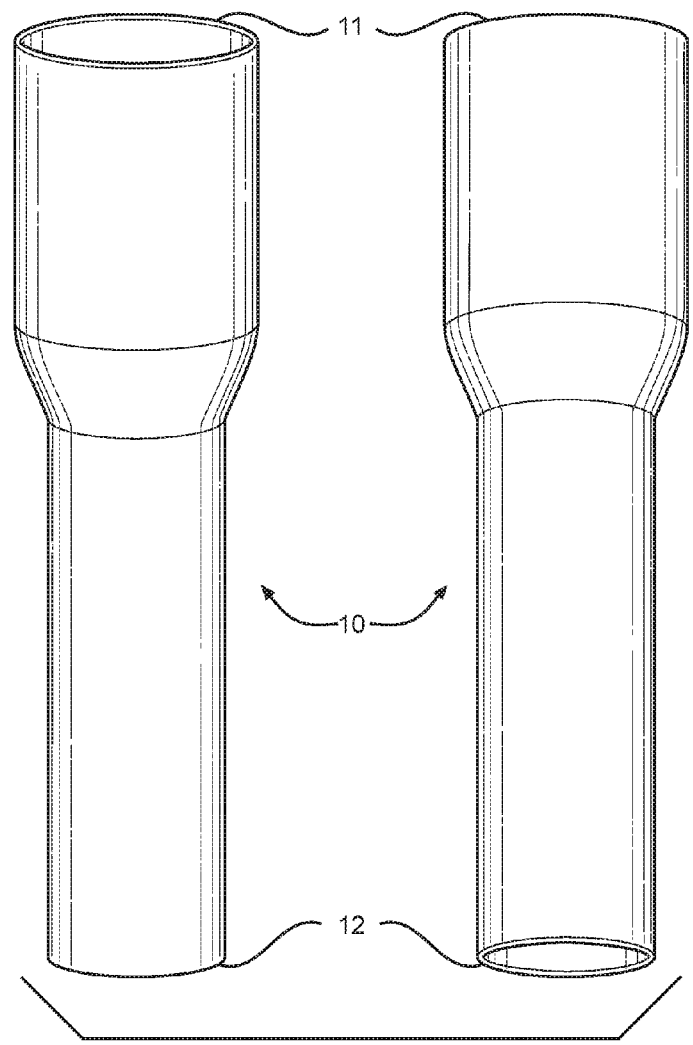
FIGS. 2A to 2C show perspective views (forward tilt and back tilt) of components of a sensor housing comprising a hollow tube (A), an end cap (B), and a ground stake assembly (C) in accordance with an embodiment.

The top end 11 of the sensor housing is open and structured to allow free, unrestricted movement of the hanging bite indicator 1 through the hollow portion of the tube. Typically, the top end 11 of the sensor housing flares outward as a result of a wider diameter compared to the diameter along lower portions of the tube (FIG. 1 and FIG. 2A). The flared opening can function to limit passage of the hanging bite indicator 1 to a region within the top end 11 of the sensor housing. FIG. 1 illustrates the placement of sensor components inside the sensor housing in this embodiment. The hanging bite indicator 1 is shown suspended upon the fishing line 8 through the flared portion at the top end 11 of the sensor housing while the functional end 24 of the transmitter extends downward toward the bottom end 12 for interaction with the receiver 25.

The receiver 25 is positioned inside of the sensor housing 10 at the bottom end 12 (FIG. 1). The bottom end 12 is closed with a permanent or removable cap 14. A solid barrier 13 is placed inside the sensor housing 10 directly above the receiver 25 to create a seal. The solid barrier 13 can be formed from a flexible plastic or other material that does not impede transmission of the magnetic field exerted by the transmitter 21. Together, the solid barrier 13 and cap 14 form a compartment within the sensor housing 10 that protects the receiver 25 from environmental elements. Moreover, the solid barrier 13 provides a surface onto which the functional end 24 of the transmitter may be placed at rest to ensure proper alignment with the receiver 25 when forming an electronic interaction.

Figure 2B:
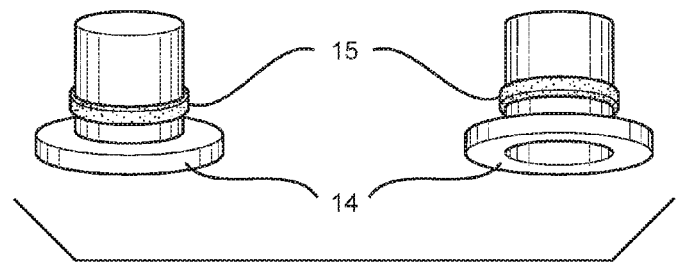

FIG. 2B shows perspective views of the cap 14 tilted forward (left) and tilted back (right). The cap 14 is formed as an insert that fits inside the bottom end 12 of the sensor housing (FIG. 1). A cap seal 15, such as a rubber gasket or O-ring, fits around the inserted portion of the cap 14 to provide for a secure and water-resistant connection to the sensor housing 10.

Figure 2C:
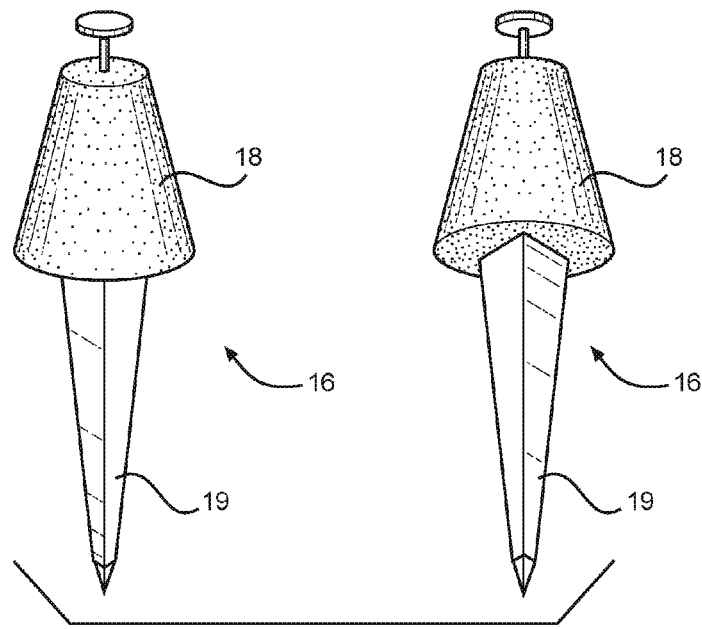
Figure 3B:
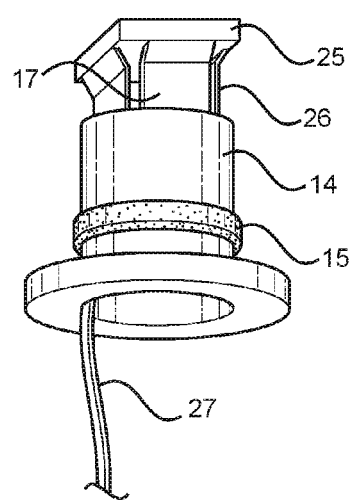

FIG. 3B reveals a perspective view of the cap 14 with a receiver 25 mounted on the top surface. This arrangement secures the receiver to the bottom end 12 of the sensor housing when the cap 14 is inserted. A spacer 17 is also used to elevate the receiver 25 above the mounting surface on the cap 14. The bottom end of the cap 14 includes a recessed surface into which a cork 18 can be securely inserted to attach a ground stake assembly 16, thus providing means for immobilizing the sensor housing 10 on the ground (FIG. 1). FIG. 2C shows perspective views of the ground stake assembly 16 when tilted forward (left) and tilted back (right). The ground stake assembly 16 comprises a ground stake 19 that passes through the cork 18 and is secured thereto in a downward orientation when the cork 18 is fit into the recessed portion of the cap 14 (FIG. 1).

Figure 4A:
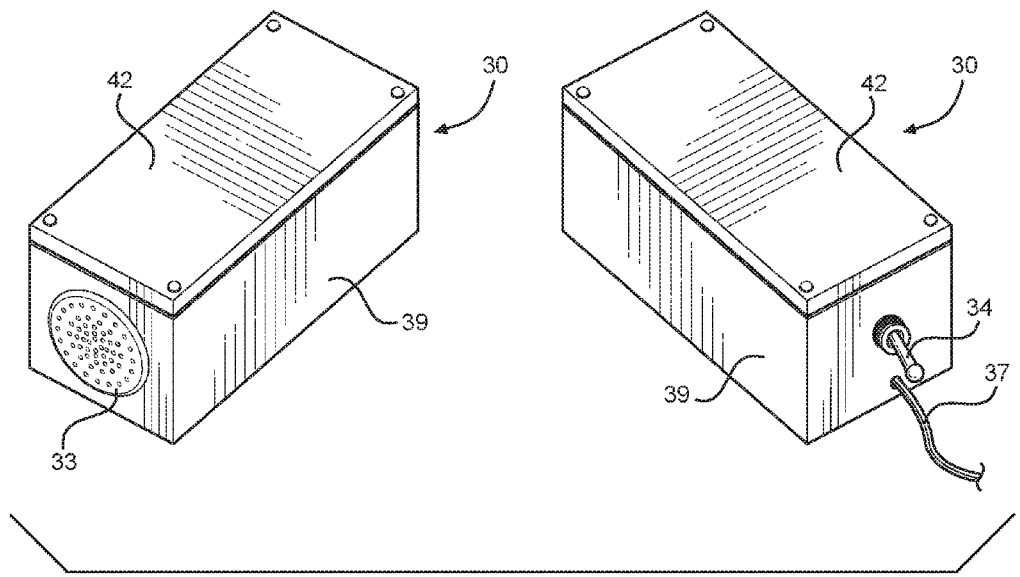
FIGS. 4A and 4B show perspective views of peripheral aspects of the front and back ends of a receiver with cover attached (A) and with an open end (B) in accordance with an embodiment.
Figure 4B:
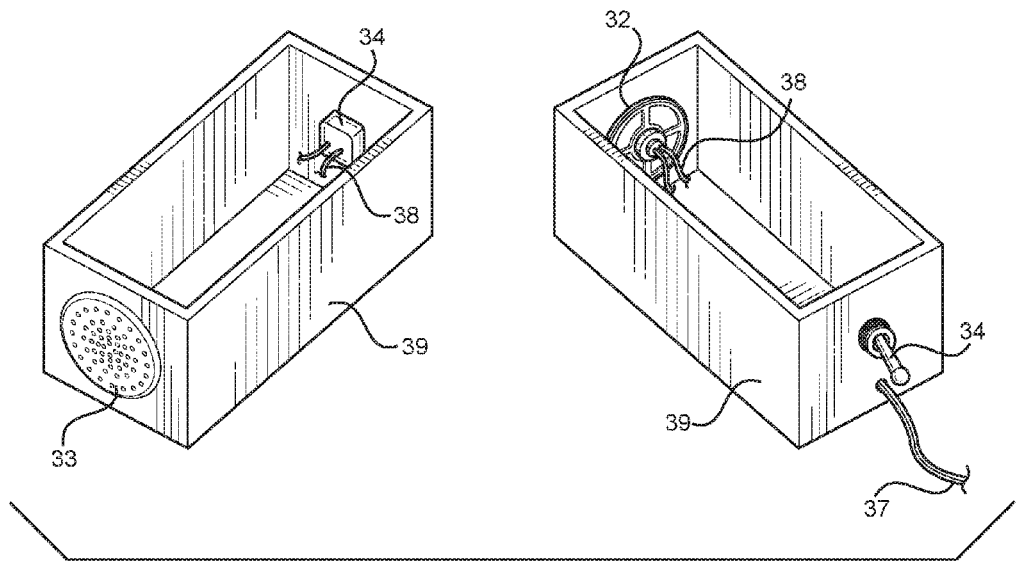
Figure 5A:
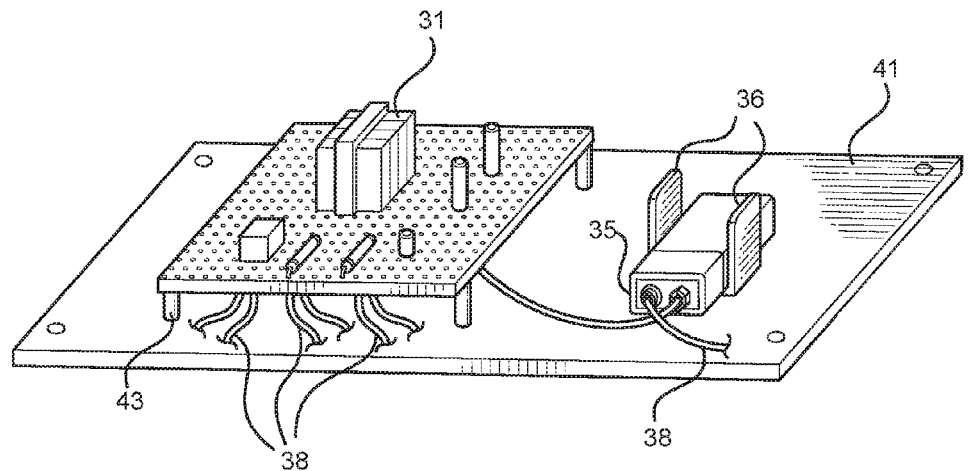
FIG. 5 shows internal components of an alarm processor facing upright (top panel) and rotated 180 degrees to face downward (bottom panel) as when sealed in the enclosure in accordance with an embodiment. Note that the battery is rotated 360 degrees when comparing the top and bottom panels in order to highlight electrical connections with the battery.
Figure 5B:
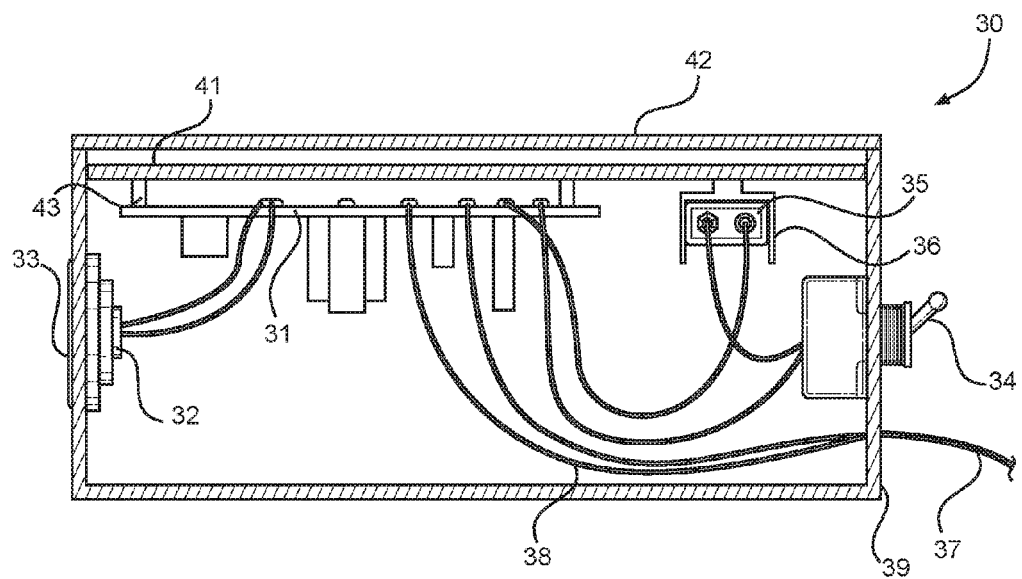

Wire connections 26 originate from the receiver 25 inside the bottom end 12 of the sensor housing and pass externally through the cap 14 to form an extension cord 27 (FIGS. 1 and 3B), the latter of which provides means for an electrical connection to an alarm processor 30. FIGS. 4A and 4B show perspective views of peripheral aspects of an alarm processor 30 in this embodiment of the apparatus. FIG. 5 follows by providing perspective and side views of the alarm processor in more detail to illustrate one arrangement of internal and external components. The alarm processor 30 comprises an enclosure 39, a circuit 31, electronic components, and electrical connections 38 for managing, activating, and producing an audible alarm based on the electronic state of the sensor. The alarm processor 30 exists as a separate component (FIGS. 4A and 4B), although it could be combined with the receiver 25 alone or together with the receiver 25 and sensor housing 10 in other embodiments (see below). In this embodiment, the alarm processor 30 is formed from a hard plastic enclosure 39 of sufficient dimensions to accommodate the alarm circuit 31, electronic components, a battery 35, and wire connections 38. The external faces of the enclosure 39 are modified to fit a power switch 34 (e.g. toggle) on one end and a speaker grill 33 on the opposite end so as to enable their access from outside of the enclosure 39. The top end of enclosure 39 can be opened to enable internal access. Alternatively, the top end of the enclosure 39 can be covered with a metal plate insert 41 followed by a hard plastic cover 42, and then secured with screws to create an internal compartment that is sealed from the outside environment (FIG. 4A and FIG. 5).

The alarm circuit 31 is arranged on a printed circuit board (PCB) mounted onto the inside face of the metal plate insert 41 on plastic spacers 43. The battery 35, which is secured in a battery clip 36 mounted adjacent to the PCB, provides electrical power to the alarm processor 30. Electrical connections 38 extend from the alarm circuit 31 to the speaker 32 and power switch 34 (FIG. 5). Electrical connections 38 from the alarm circuit 31 are also passed through a hole in the enclosure 39 to the exterior side to form an extension cord 37 that connects with the extension cord 27 on the receiver, thereby forming an electrical connection between the sensor 20 and alarm processor 30 (not shown).

Figure 6:
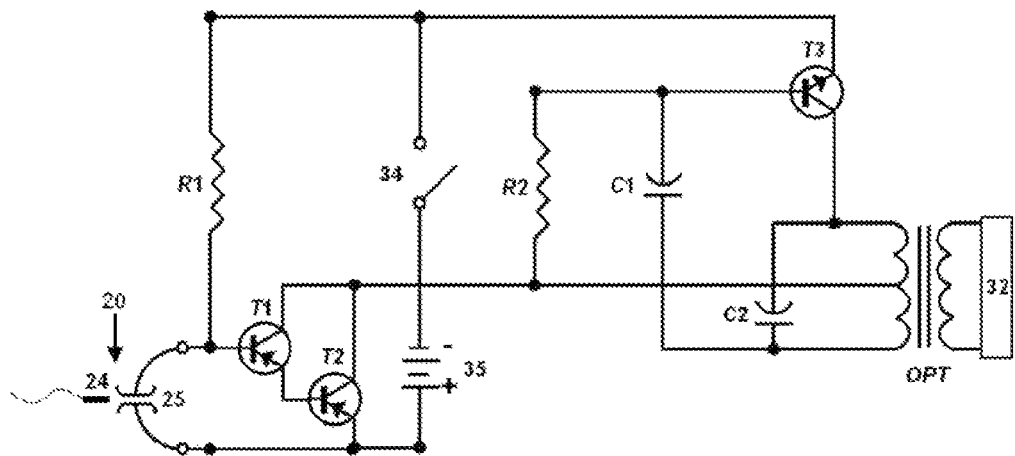
FIG. 6 is a circuit diagram for a two-loop circuit that is compatible with an alarm processor in accordance with an embodiment.
Figure 7:
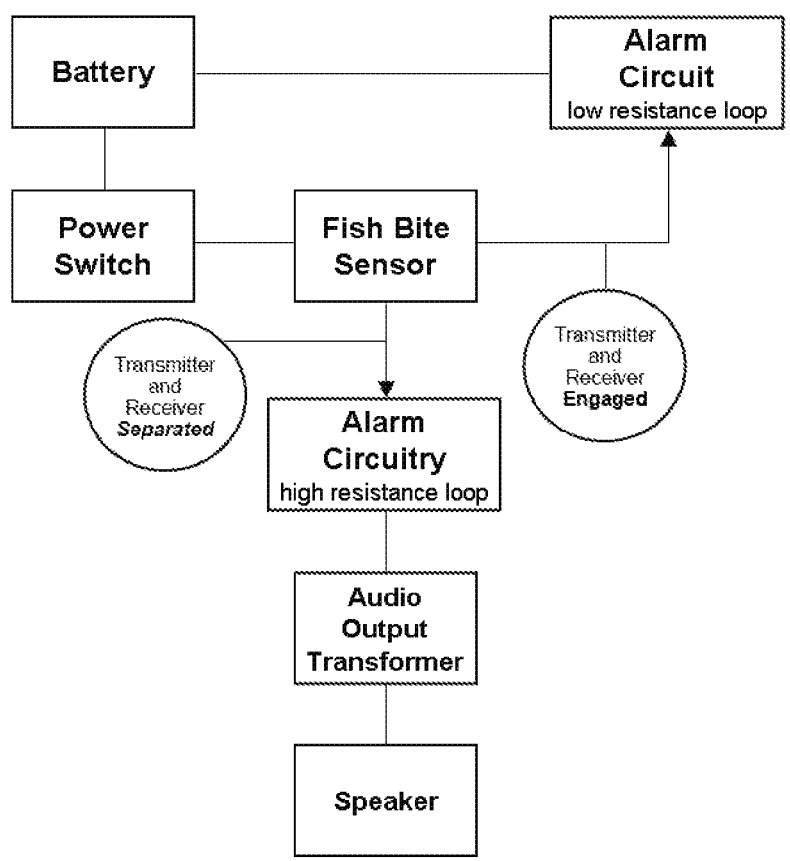
FIG. 7 is a block diagram illustrating the operation of an electronic bite alarm employing a two-loop circuit configuration in accordance with an embodiment.
Figure 8:
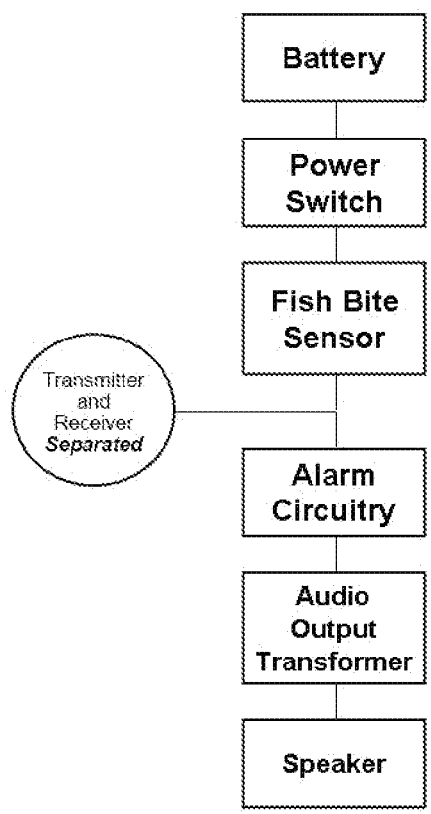
FIG. 8 is a block diagram illustrating the operation of an electronic bite alarm employing a single-loop circuit configuration in accordance with an embodiment.

FIG. 6 shows a circuit diagram of an alarm circuit 31 that is compatible with the present embodiment of the apparatus. The alarm circuit 31 is a two-loop circuit having common electronic components, such as resistors (R1-R2), capacitors (C1-C2), transistors (T1-T3), an output transformer (OPT), speaker 32, power switch 34, and a battery 35. Also diagrammed are select components of the fish bite sensor 20 that function in the circuit, namely the functional end 24 of the transmitter and the receiver 25. As shown in FIG. 6 and FIG. 7, engaging the transmitter with the receiver induces the "closed" configuration of the sensor 20 that completes a low-resistance path in the circuit and causes current to bypass the PNP transistors (T1-T2) and remaining parts of the circuit responsible for sounding the audible alarm. When the functional end 24 of the transmitter is separated from the receiver 25, creating the "open" state of the sensor 20, the low-resistance path is disrupted and electrical current redirects through the high-resistance path to energize the PNP transistors (T1-T2) and ultimately the OPT and speaker 32 to produce an audible alert. Alternatively, FIG. 8 demonstrates how a single-loop circuit would mediate sounding of an alarm in the absence of a low-resistance path.

OPERATION

Figure 9:
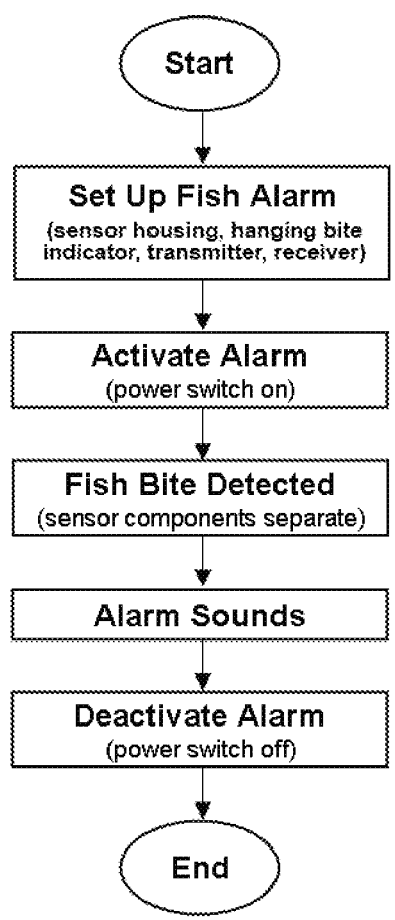
FIG. 9 is a flowchart illustrating the method of use for an electronic fish alarm in accordance with an embodiment.

FIG. 1, FIG. 3A, and FIG. 9

The manner of using this embodiment of the apparatus is similar to that of using a hanging bite indicator 1 according to conventional methods, with the exception of a few unique steps required to adapt the hanging bite indicator 1 for use with the alarm, as shown in FIG. 9. First, a hanging bite indicator 1 that is compatible with the sensor housing 10 is selected. The fisherman can typically use a fishing bobber small enough in diameter to fit freely into the open top end 11 of the sensor housing in a manner that allows unrestricted vertical motion of the hanging bite indicator 1. In addition, the hanging bite indicator 1 is usually equipped with top- and bottom-side attachment hardware (e.g. hooks) used to connect to the fishing line 8 and to the connector end 23 of the transmitter, respectively. Fishing bobbers commonly have hooks on the top and bottom ends that can be manipulated using a push-spring mechanism. The top-side attachment hook of the hanging bite indicator 1 is fitted with an open snap swivel to enable hanging on the fishing line, in accordance with conventional methods; the bottom-side attachment hook is connected to the connector end 23 of the transmitter via a ring connector as depicted in FIG. 1 and FIG. 3A.

Next, the ground stake assembly 16 is fitted into the recessed bottom end of the cap 14 (FIG. 1) and the sensor housing 10 is subsequently staked into the ground at a desired fishing location. The sensor housing 10 can be staked close to shore but with enough distance to prevent exposure to water from incoming waves, such as those caused by boat wakes. Furthermore, the sensor housing 10 is placed directly below the hanging bite indicator 1 in a fixed position relative to the rod 4. Optimal placement of the sensor housing 10 can be determined by first immobilizing a fishing rod at about a 15 to 60 degree angle in a rod holder with two eyelets 6 of the rod positioned about 1 to 3 feet directly above the desired location. The hanging bite indicator 1 is then hanged via the open snap swivel on taut fishing line 8 between the two eyelets 6 of the rod. Slack in the fishing line is then slowly released until the hanging bite indicator 1 drops to within a range of approximately 1 to 6 inches above the ground. The optimal ground placement for the sensor housing assembly is the position where the hanging bite indicator 1 hangs at its lowest point and is least susceptible to variaitons in horizontal displacement when close to the ground.

The sensor 20 is then connected to the alarm processor 30 via both extension cords (see 27 and 37, respectively). The power switch 34 on the alarm processor 30 is switched "off" while making this connection. The alarm processor 30 is then placed on the ground or other solid surface so that the speaker grill 33 positions toward the fisherman to allow for the best audible detection of the electronic alert. After this initial setup, the alarm can be repeatedly employed each time the fishing line 8 is baited and cast by using the following steps:

a. Cast the baited fishing line, usually prepared for bottom fishing, into a desired location of water and allow the end of the line to come to rest as it sinks to the bottom. Reel in remaining slack until the baited fishing line is taut. Immobilize the rod 4 in a holding bracket or rod holder.

b. Place the hanging bite indicator 1 with transmitter 21 attached on the baited fishing line 8 between two eyelets 6 of the fishing rod that position above the sensor housing 10 as shown in FIG. 1. Carefully release line from the reel to allow the hanging bite indicator/transmitter assembly to lower into the open top end 11 of the sensor housing. Continue to guide the hanging bite indicator/transmitter assembly through the sensor housing 10 until the functional end 24 of the transmitter contacts the solid barrier 13. Reel in a short length of fishing line 8 so that the functional end 24 of the transmitter hangs immediately above the solid barrier 13 in a position that maintains electromagnetic contact with the receiver 25 while keeping the baited fishing line taut. The fishing line 8 should remain taut and caution should be taken to not disturb the baited end.

c. Arm the fish alarm to a ready-to-activate state by switching the power switch 34 on the alarm processor 30 to the "On" position. When a fish bite draws tension from the line, the hanging bite indicator 1 is pulled upward and out the sensor housing 10, causing the transmitter 21 to separate from the receiver 25, thereby triggering the audible alarm. After the alarm is activated, the hanging bite indicator/transmitter assembly remains on the fishing line 8 and can be further used to set the hook in accordance with conventional methods. The alarm can be deactivated or disarmed by switching the power switch 34 into the "Off" position.

FIG. 10

ADDITIONAL EMBODIMENT

Figure 10:
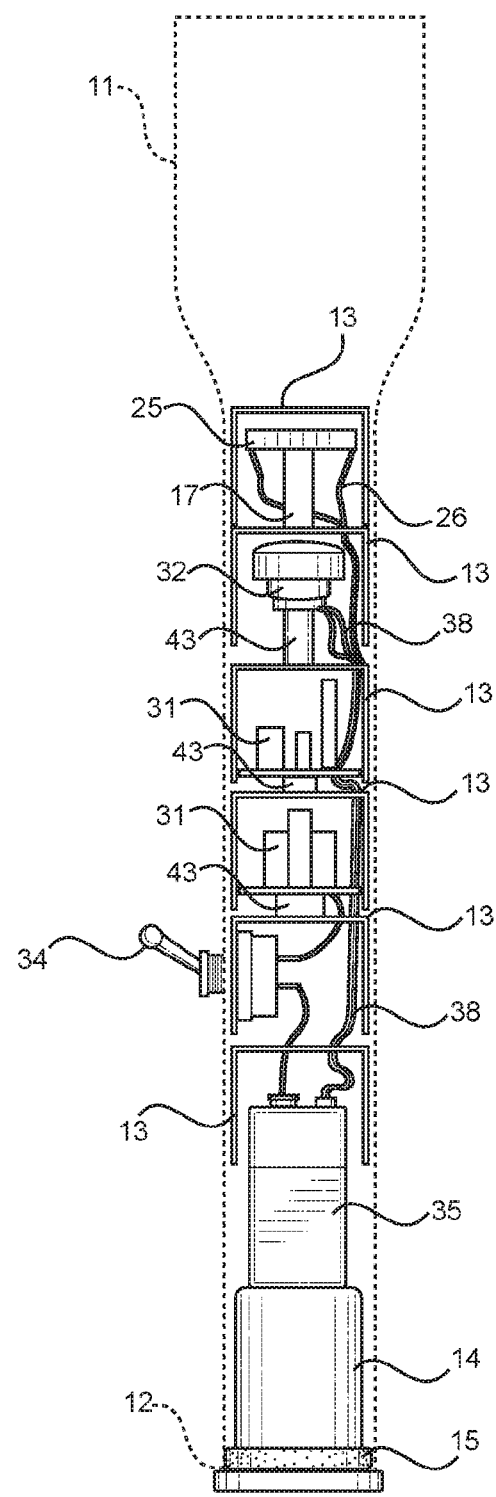
FIG. 10 shows a side view of a receiver and an alarm processor combined in a sensor housing in accordance with an embodiment.

Another embodiment of the present apparatus is shown in FIG. 10, in which both the receiver 25 and alarm processor 30 are combined in the sensor housing 10. The top end 11 of the sensor housing is illustrated with an open end. A first solid barrier 13 positions below the flared segment at the top end 11 of the sensor housing and creates a flat surface that seals the internal components in lower portions of the tube from the outside environment. A second solid barrier 13 is attached to a receiver 25 (such as an electromagnetic switch mounted on a plastic spacer 17) and positions immediately beneath the first solid barrier 13 so as to enable electronic interaction between the receiver 25 and an engaging transmitter 21. In a similar fashion, a speaker 32, which is also mounted onto a spacer 43 and then onto a third solid barrier 13, positions beneath the second solid barrier 13. An alarm circuit 31 and electronic components are similarly arranged in successively descending segments in the sensor housing 10 to create sealed compartments. Additional spacers 43 are used to mount the alarm circuit 31 and associated electronic components at an elevated position above the solid barriers. The power switch 34 is fitted through a hole in the sensor housing 10 so that both external and internal portions are properly oriented. Another solid barrier 13 positions below the power switch 34 and creates the lower seal for the above compartment of internal components. A battery 35 is placed in the internal compartment at the bottom end 12 of the sensor housing below the lowest solid barrier 13. The cap 14 with attached cap seal 15 inserts into the bottom end 12 of the cylinder and seals the battery 35 inside of the sensor housing 10. Electrical connections (26 and 38) pass through the second and lower solid barriers 13 to connect the receiver 25, speaker 34, alarm circuit 31, power switch 34, and battery 35. A ground stake assembly 16 may also be employed with this embodiment to anchor the apparatus to the ground.

The manner of use of this embodiment is nearly identical to that described for the previous embodiment that employs a sensor housing 10. The main exceptions are that the receiver 25 and alarm processor 30 do not require a connection via extension cords and that there is no requirement to place the alarm processor 30 on the ground in a position separate from the receiver.

Figure 11:
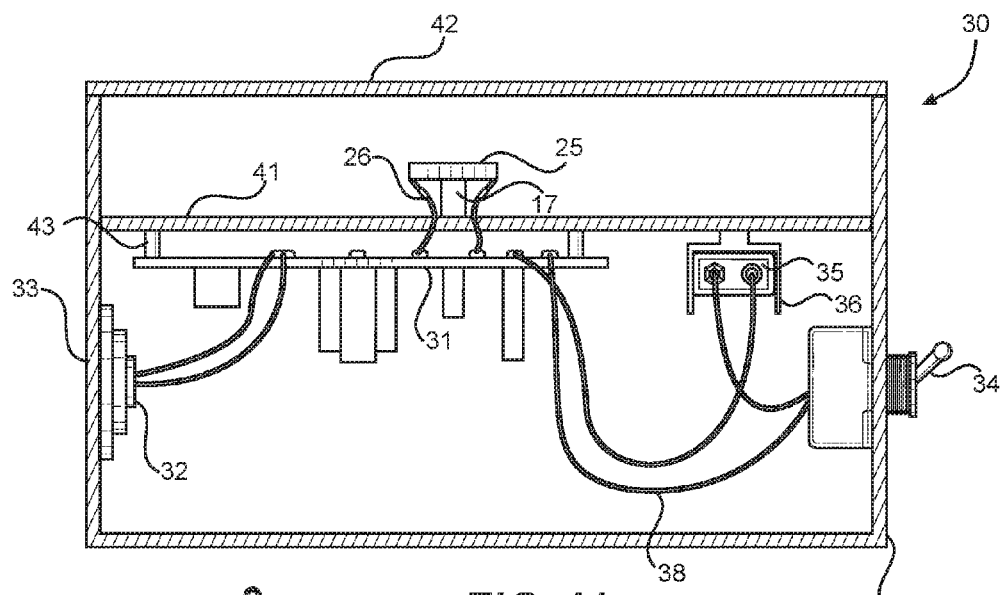
FIG. 11 shows a side view of a receiver and an alarm processor combined in an enclosure in accordance with an embodiment.

FIG. 3B and FIG. 11

ALTERNATIVE EMBODIMENTS

In another embodiment, the fish bite alarm operates without a sensor housing. This may be appropriate when fishing in mild weather when there is little to no wind to cause non-specific movements in the hanging bite indicator. In this case, the receiver is formed without a sensor housing and instead is mounted on a support for direct placement on the ground or for staking into the ground via an attached ground stake assembly. The receiver 25 shown previously in FIG. 3B provides a basic example of a receiver component that may operate without a sensor housing. In this case, a receiver 25 mounted onto a cap 14 (for proper orientation), and any associated electrical connections, provide the basic components needed for interaction with a transmitter 21 to render a fully operational sensor.

FIG. 11 is a side view of yet another embodiment that operates without a sensor housing. In this case, the receiver is mounted to the inside of the alarm processors' enclosure 39, thus combining both elements into a single housing structure. The enclosure 39 in this embodiment is formed from material or in a manner that enables the receiver 25 to respond to the transmitter's magnetic end when in close spatial proximity. As in previous embodiments, the receiver 25 is oriented in a position that allows electronic interaction with the transmitter 21.

Operation of the apparatus shown in FIG. 11 is similar to that of aforementioned embodiments that require either separate or contiguous placement of the receiver and alarm processor (FIG. 1 and FIG. 10, respectively). The main difference in operation is the apparatus depicted in FIG. 11 does not require use of a hanging bite indicator 1 that is compatible with the dimensions of a sensor housing 10. Likewise, the user is also not required to guide the hanging bite indicator 1 down a sensor housing in order to establish an electronic interaction between the transmitter 21 and the receiver 25. Instead, the receiver 25 is placed under the hanging bite indicator 1 as previously indicated, and then the transmitter 21 is lowered into contact with the receiver 25 without the aid of a sensor housing.

FIG. 12

ADDITIONAL EMBODIMENT

Figure 12A:
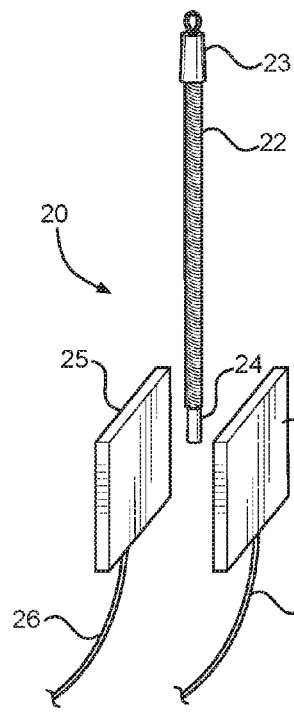
FIGS. 12A and 12B show perspective views of versions of a sensor having a transmitter and receiver that operate as an electromechanical switch mechanism in accordance with an embodiment.
Figure 12B:
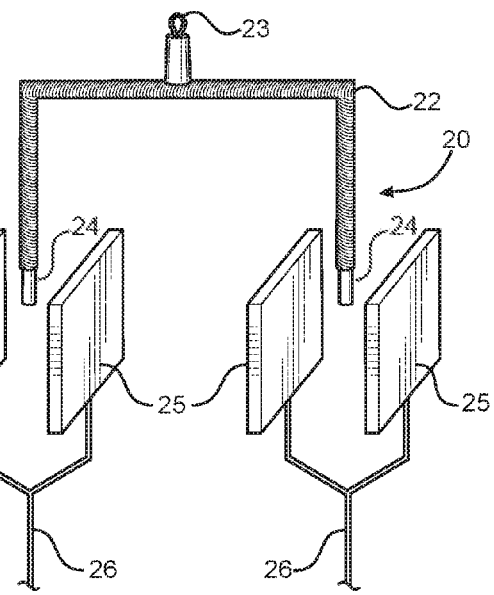

FIGS. 12A and 12B show perspective views of other embodiments of a sensor 20 that function using an electro-mechanical switch mechanism. In these cases, the sensor 20 operates through direct contact interactions between a transmitter 21 having an electrode(s) at its functional end 24 and receiver 25 having an electrode receptor. The transmitter 21 in this embodiment is formed from one (FIG. 12A) or multiple (FIG. 12B) electrical contacts or electrodes that function to bridge or transmit current across a separate set of electrical contacts or conductive plates that compose the receiver 25. The distance that separates the conductive plates in the receiver 25 is slightly larger than the diameter or a dimension of the electrode(s) at the transmitter's functional end 24 such that the electrodes make electrical contact when wedged between the conductive plates. Bridging current in this manner renders an electrical switch mechanism in the "closed" configuration, which arms the fish bite alarm to a ready-to-activate state. Removing the electrodes at the functional end 24 of the transmitter from electrical contact with the conductive plates of the receiver 25 induces the "open" state of the switch to activate and sound the alarm. FIGS. 12A and 12B provide examples of the conductive plates of a receiver 25 without a housing, mount, or support, which would normally be employed. Also note that in the example shown in FIG. 12A, each lead wire forms an electrical connection 26 to a single conductive plate when the transmitter contains a single electrode or functional end 24, whereas in FIG. 12B, each lead wire connects to a pair of conductive plates when using a transmitter with multiple electrodes.

The method of use for these embodiments that employ an electromechanical switch mechanism is similar to the operation of aforementioned embodiments that operate with or without a sensor housing. The main difference in operation in these embodiments is that the interaction between the first contact interface at the functional end 24 of the transmitter and the second contact interface of the receiver 25 requires direct, physical contact. The user is required to connect the electrode(s) to the electrode receptor so as to make an electrical connection between conductive surfaces.

FIG. 13

ALTERNATIVE EMBODIMENT

Figure 13:
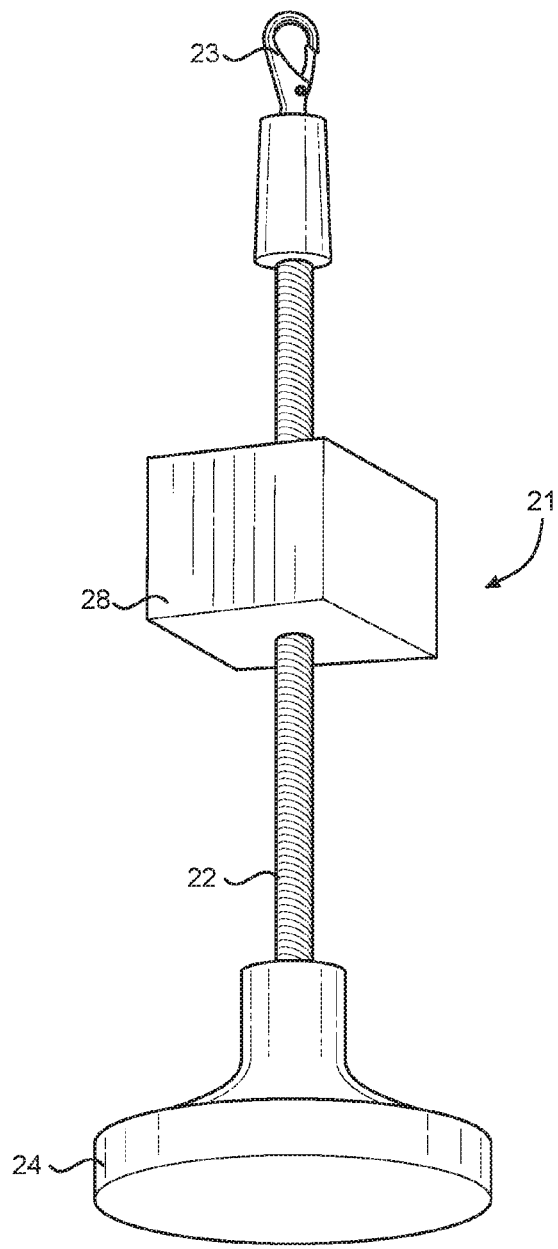
FIG. 13 is a perspective view of a transmitter also including attachment hardware and a counterweight to enable use as a hanging bite indicator in accordance with an embodiment.

FIG. 13 is a perspective view showing another version of a transmitter 21 that also functions as a hanging bite indicator. The transmitter's connector end 23 is formed with attachment hardware (e.g. a hooking mechanism or open snap swivel) that enables placement of the transmitter directly on the fishing line. The transmitter also includes a counterweight 28 of sufficiently heavy material to hold a fishing line taut. This counterweight 28 could be a small, lightweight object, such as a hollow plastic structure in the shape of a cube that weighs approximately one ounce. The functional end 24 in this embodiment does not incorporate any additional features, and thus may be formed in accordance with other embodiments.

This version of the transmitter is used in a manner that is nearly identical to the methods of use for the embodiments described previously, except that the user is not required to supply a hanging bite indicator for use with the alarm, nor is the user required to attach the transmitter 21 to the hanging bite indicator 1 via the connector end 23. Instead, the transmitter is hanged directly on the fishing line via its connector end 23 for use as both a hanging bite indicator and as an alarm sensor component.

ADVANTAGES

From the description above, a number of advantages of some embodiments of my electronic fish bite alarm become evident:

a. An electronic alarm, such as one that emits an audible alert, can be added as an accessory function to a hanging bite indicator so that the angler can look away from the rod during fishing while still listening for an audible alert to indicate a fish bite.

b. The electronic alarm is not designed for use with any specific type of hanging bite indicator but instead can be adapted for use with virtually any type of weighted mass that functions as a hanging bite indicator, including those improvised from an ordinary fishing bobber and snap swivel according to conventional methods.

c. Addition of the electronic alarm requires little modification of the hanging bite indicator, does not alter or place burden on the fishing gear, and allows for conventional/visual use of the hanging bite indicator at any time during fishing, regardless of the alarm's status.

d. An electronic bite alarm can be coupled with a fishing method that is highly sensitive to minute pulling forces produced by a fish nibble, thus providing the user with the best chance of detecting a fish bite.

e. The audible alarm is continuously sounded until deactivated by the user, thereby ensuring that the fish bite alert is heard.

f. The source of the audible alert is not physically connected to the fishing gear, thus minimizing the risk of disturbing a feeding fish by transmitting sound down the fishing line and into the water.

g. The simple design of the electronic fish bite alarm allows it to be fabricated into a compact and light device that can be further optimized to improve ease of transport with fishing tackle.

CONCLUSIONS, RAMIFICATIONS, AND SCOPE

Accordingly, the reader will see that the electronic fish bite alarm of various embodiments can be used to convert virtually any type of hanging bite indicator into an electronic alarm by simply attaching a transmitter to its bottom side. Adding the electronic alarm function complements but does not interfere with the process normally undertaken to identify and hook a fish when using a hanging bite indicator. Addition of a non-visual alert, such as an audible tone, alleviates the requirement of the user to maintain constant watch on the hanging bite indicator when fishing. Instead, the fisherman has the option to monitor fish activity by simply listening for the electronic alert indicative of a fish bite. After the alarm is activated and the user is alerted, the hanging bite indicator is retained on the fishing line for further use as a visual bite indicator to properly hook retrieve the fish. Furthermore, the electronic bite alarm has additional advantages in that:

it permits implementation of an electronic audible alarm with a fishing method that is used prevalently by fisherman but is typically limited to providing a visual indication of a fish bite;

it permits implementation of an electronic alarm with a conventional fishing method that is effective in detecting minute increases in fishing line tension produced by a fish bite or nibble;

it provides an optional housing for the hanging bite indicator and sensor to minimize the occurrence of false alarms due to lateral/rotational motion caused by wind or other external forces not related to a fish bite;

it provides an audible alarm that sounds persistently until deactivated by the user, thus ensuring that the alert will be perceived;

it enhances the user's ability to identify the earliest stages of a fish bite event;

it produces an audible alert from a source that is not physically connected to the fishing pole or line and thus minimizes the risk of disturbing the underwater fish environment with unnatural sounds originating from the alarm and transmitting down the fishing line into the water; and it permits fabrication with lightweight material for easy transport with fishing tackle due to its simple structure.

Although the description above contains many specificities, these should not be construed as limiting the scope of the embodiments but as merely providing illustrations of some of the presently preferred embodiments. Importantly, the method of attaching the transmitter to the hanging bite indicator could involve a variety of different connectors or adhesives. For example, a transmitter could conceivably be affixed to the bottom of a hanging bite indicator by simply using double-sided tape at the connector end. This ability to employ a wide variety of connecting materials at the connector end of the transmitter is responsible for the compatibility of the electronic fish bite alarm with virtually any type of weighted mass supplied for use as a hanging bite indicator. Moreover, connectors or adhesives may be used to attach the transmitter's connector end to its functional end or to attach the functional end of the transmitter directly to the hanging bite indicator. For example, a magnet attached directly to the bottom of a hanging bite indicator with double-sided tape would constitute a fully functional hanging bite indicator/transmitter assembly for an electronic alarm operating with an electromagnetic switch mechanism. It is also contemplated that the transmitter is connected to the hanging bite indicator in a region other than the bottom end, so long as the functional end of the transmitter remains capable of interacting with the receiver. In this case, the transmitter's tether may be formed in a non-straight configuration to allow proper alignment of the functional end with the receiver.

Other embodiments employ a transmitter that interacts with a receiver via direct or indirect contact with an intermediate element(s) that then transmits the signal to the receiver via direct or indirect interaction, thereby influencing the electronic state of the sensor.

Another embodiment employs a sensor that operates using a normally-closed electromagnetic switch mechanism for a receiver. In this case, a single-loop circuit may be contemplated for use with the alarm processor. Alternatively, the sensor could comprise a transmitter and receiver that operate to influence the electronic state of the sensor by another suitable means of communication or contact, such as through radio transmissions, optical transmissions, wireless internet transmissions, acoustic transmissions, mechanical transmissions or events, chemical reactions or events, biological reactions or events, and any combination thereof.

Another embodiment incorporates an alarm processor that emits a visual alert, such as that provided by an indicator light of predetermined intensity, color, or flash frequency. Alternatively, the alarm processor could be designed to produce a wired or wireless audible alert that sounds through headphones, an earpiece, or any portable module capable of delivering the alert to the user. Other embodiments of the alarm processor may employ a tactile alert, such as one delivered through a portable device with a vibrating alarm.

An additional embodiment of the alarm processor incorporates a latching relay to enable continuous activation of the alarm upon being triggered, even after the transmitter is allowed to re-engage the receiver. Other embodiments of the alarm processor may also include additional electronic controls or features, such as LED lights to indicate the power status of the alarm processor, switches to control variations in the electronic alert, such as volume, pitch, and pattern for an audible alert, or intensity, color, and flash frequency for a visual alert. Other embodiments of the alarm processor may include additional electronic modifications to allow multiple receivers to function with a single alarm processor. Moreover, an integrated circuit board could be employed in any of these cases.

Another embodiment of the alarm processor employs a housing alternate to the enclosure 39 that supports the components of the alarm processor while not enclosing them.

In other embodiments, the sensor housing may be used for purposes other than functioning as a wind barrier. For example, the sensor housing may be designed with the primary purpose of incorporating aesthetic features or novelty functions so long as the sensor housing enables the transmitter to directly or indirectly interact with the receiver.

In an alternate embodiment, the receiver or sensor housing of the alarm apparatus is not positioned on or staked into the ground but instead may be affixed to a support arm that is connected to the fishing rod or to a holding bracket so as to properly position the receiver or sensor housing in an orientation accessible to the transmitter for electronic interaction. Alternatively, hardware other than ground stakes (e.g. tripods, spikes, platforms, tethers) may be used for securing or placing the receiver 25 on the ground or other surface.

Accordingly, the scope should be determined not by the embodiments illustrated, but by the appended claims and their legal equivalents.

What is claimed is:

1. An electronic fish bite alarm for use with a freely hanging visual bite indicator that sags on a baited fishing line guided by the fishing rod and reel, said alarm comprising:
   a. a sensor having a transmitter and a receiver that control the electronic state of said sensor through contact interactions,
   b. said sensor having electronic means for detecting changes in fishing line tension when coupled with a freely hanging visual bite indicator, such that when coupled said transmitter and the freely hanging visual bite indicator form a complex that hangs on the guided fishing line without contacting other elements of said fish bite alarm, and in which increased tension in the fishing line causes movement of the freely hanging visual bite indicator that disrupts interaction between said transmitter and said receiver and alters the electronic state of said sensor,
   c. said transmitter comprising at one end a first contact interface for interaction and at a second end attachment means for connecting to and moving in concert with a freely hanging visual bite indicator in a configuration that exposes said first contact interface for direct or indirect interaction with said receiver,
   d. said receiver positioned around said transmitter, but not contacting the transmitter or the fishing line, and said receiver having a mount, a second contact interface for interaction, and means for directly or indirectly engaging said second contact interface with said first contact interface of said transmitter in a manner that influences the electronic state of said sensor when used with a freely hanging visual bite indicator,
   e. an alarm processor having a housing, a circuit, electronic components, and electrical connections for communicating with said sensor and for providing means for managing and activating an electronic alert based on the electronic state of said sensor,
   whereby movement of the freely hanging visual bite indicator caused by a fish bite disrupts contact between said transmitter and said receiver, thereby activating said alarm processor to produce an electronic alert that complements the visual alert rendered by the freely hanging visual bite indicator, which remains attached to the fishing line.

2. The electronic fish bite alarm in claim 1 wherein said sensor comprises an electromagnetic switch mechanism having a magnet for said transmitter and an electromagnetic switch for said receiver.

3. The electronic fish bite alarm in claim 1 wherein said receiver and said alarm processor are located on or within the same housing.

4. The electronic fish bite alarm in claim 1 further including a sensor housing that comprises a hollow material into which said receiver is positioned or mounted, said sensor housing having at least one open end of substantial dimension through which said transmitter may pass freely and means for optimizing contact between said transmitter and said receiver within said sensor housing so as to improve functionality of said sensor when used with a freely hanging visual bite indicator.

5. The electronic fish bite alarm in claim 4 wherein said sensor housing comprises said material sufficiently rigid to resist the forces of wind and means for minimizing non-specific movement of the hanging bite indicator caused by wind.

6. The electronic fish bite alarm in claim 4 wherein said sensor housing further includes a support means for said alarm processor.

7. An electronic fish bite alarm employing a freely hanging visual bite indicator, said alarm comprising:
   a. a sensor having of a transmitter and a receiver that control the electronic state of said sensor through contact interactions,
   b. said sensor having electronic means for detecting changes in fishing line tension in which increased tension in the fishing line causes movement that alters interaction between said transmitter and said receiver and alters the electronic state of said sensor,
   c. said transmitter having a first contact interface for interaction, and means for direct or indirect attachment to the baited fishing line for use as a freely hanging visual bite indicator so that said transmitter hangs on the guided fishing line but does not contact other elements of said fish bite alarm, and so that said first contact interface remains in a configuration accessible for direct or indirect interaction with said receiver,
   d. said receiver positioned around said transmitter, but not contacting the transmitter or the fishing line, and said receiver having a mount, a second contact interface for interaction, and means for directly or indirectly engaging said second contact interface with said first contact interface of said transmitter in a manner that influences the electronic state of said sensor,
  e. an alarm processor having a housing, a circuit, electronic components, and electrical connections for communicating with said sensor and for providing means for managing and activating an electronic alert based on the electronic state of said sensor,
whereby movement of said transmitter when functioning as a freely hanging visual bite indicator alters interaction with said receiver, thereby activating said alarm processor to produce an electronic alert that complements the visual alert rendered by the freely hanging visual bite indicator, which remains attached to the fishing line.

8. The electronic fish bite alarm in claim 7 wherein said sensor comprises an electromagnetic switch mechanism having a magnet for said transmitter and an electromagnetic switch for said receiver.

9. The electronic fish bite alarm in claim 7 wherein said receiver and said alarm processor are located on or within the same housing.

10. The electronic fish bite alarm in claim 7 further including a sensor housing that comprises a hollow material in which said receiver is positioned or mounted, said sensor housing having at least one open end of substantial dimension through which said transmitter may pass freely and means for optimizing contact between said transmitter and said receiver within said sensor housing so as to improve functionality of said sensor.

11. The electronic fish bite alarm in claim 10 wherein said sensor housing comprises said material sufficiently rigid to resist the forces of wind and means for minimizing non-specific movement of said transmitter caused by wind.

12. The electronic fish bite alarm in claim 10 wherein said sensor housing further includes a support means for said alarm processor.

13. A method for employing an electronic fish bite alarm adapted for use with a freely hanging visual bite indicator that is suspended on baited fishing line guided by the fishing rod and reel, the steps comprising:
  a. forming a sensor having a transmitter and a receiver that control the electronic state of said sensor through contact interactions,
  b. forming said sensor having electronic means for detecting changes in fishing line tension when coupled with or employed in part as a freely hanging visual bite indicator in which increased tension in the fishing line causes movement of the freely hanging visual bite indicator that disrupts interaction between said transmitter and said receiver and alters the electronic state of said sensor,
  c. attaching said transmitter having a first contact interface for interaction to a freely hanging visual bite indicator or directly to the baited fishing line for use as a freely hanging visual bite indicator so that said transmitter hangs from the guided fishing line without contacting other elements of said fish bite alarm, and so that said first contact interface remains in a configuration accessible for interaction with said receiver,
  d. placing said receiver having a second contact interface for interaction in a position beneath and around said transmitter that is assembled on the baited fishing line, said receiver not contacting the transmitter or the fishing line,
  e. releasing slack in the baited fishing line so as to lower the freely hanging visual bite indicator and said transmitter toward said receiver for engaging said first contact interface of said transmitter with said second contact interface of said receiver to induce an electronic state in said sensor that renders said fish bite alarm ready-to-activate when armed,
  f. providing an alarm processor having a housing, a circuit, electronic components, electrical connections, and a power supply for communicating with said sensor and for managing and activating an electronic alert,
  g. positioning said alarm processor at a predetermined distance from said receiver so as to allow for optimal access to said alarm processor for managing the armed, disarmed and activated states of said electronic fish alarm,
  h. arming said electronic fish alarm to a ready-to-activate state that is triggered when increased tension in the fishing line due to a fish bite causes the freely hanging visual bite indicator to displace relative to said receiver, thus disrupting interaction between said transmitter and said receiver,
  i. retaining the hanging bite indicator on the baited fishing line following activation of said fish bite alarm so as to enable the angler with continued use of the hanging bite indicator in order to maintain a visual alert means of detecting fish bite patterns when hooking the fish.

14. The method in claim 13 wherein said first contact interface of said transmitter engages said second contact interface of said receiver through indirect, non-physical contact.

15. The method in claim 13 further including providing a sensor housing comprising a hollow material in which said receiver is positioned or mounted and guiding said first contact interface of said transmitter through an open end of said sensor housing so as to enable interaction with said receiver.

16. The method in claim 13 wherein said alarm processor is positioned contiguously with said receiver.

17. The method in claim 13 wherein said receiver is placed beneath said transmitter using a securing means to immobilize said receiver relative to the fishing rod.

* * * * *